United States Patent [19]

Tsolis

[11] 4,442,268

[45] Apr. 10, 1984

[54] N-(SUBSTITUTED PHOSPHINYL) POLYAMIDES

[76] Inventor: Alexandros K. Tsolis, 171 Old National Road, Arahovitika, Patra, Greece

[21] Appl. No.: 290,087

[22] Filed: Aug. 4, 1981

[51] Int. Cl.³ .................... C08G 69/48; C08G 69/42
[52] U.S. Cl. .................... 525/420; 8/115.5; 525/432; 528/310; 528/321; 528/323; 528/337; 528/347; 528/348
[58] Field of Search .................... 528/337; 525/420

[56] References Cited

U.S. PATENT DOCUMENTS 3,043,810  7/1962  Deichert et al. .................... 528/337

Primary Examiner—Harold D. Anderson
Attorney, Agent, or Firm—Hubbell, Cohen, Stiefel & Gross

[57] ABSTRACT

N-(Substituted phosphinyl) polyamides and a method for their production are disclosed. The N-(substituted phosphinyl) polyamides are characterized by the recurring unit structure represented by the formula

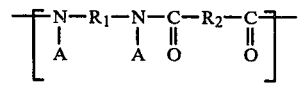

wherein A is in part hydrogen and in part a substituted phosphinyl radical. One method of producing the N-(substituted phosphinyl) polyamides is treating N-chlorinated polyamide with substituted phosphinyl compounds. The disclosed N-(substituted phosphinyl) polyamides exhibit excellent thermal stability fire resistance, good processability, high water absorption and permeability. The N-(substituted phosphinyl) polyamides are useful for making flame resistant textile materials.

5 Claims, No Drawings

N-(SUBSTITUTED PHOSPHINYL) POLYAMIDES

SUMMARY OF THE INVENTION

This invention relates to novel N-(substituted phosphinyl)polyamides of the general Formula I

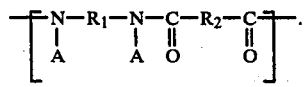     I and of the general Formula II

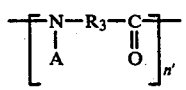     II to methods of making the same and to fire restistant compositions containing such compounds.

In the compounds of the general Formual I, A is in part hydrogen and in part substituted phosphinyl of the formula

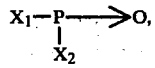

wherein $X_1$ and $X_2$ are the same or different radicals selected from the group consisting of alkoxy, cycloalkoxy, aryloxy, arylalkoxy alkyl, aryl as well as such radicals containing substituents preferably chlorine or bromine. In addition $X_1$ and/or $X_2$ can be a substituted amino radical preferably dimethylamino, diethylamino or aziridinyl radical. In addition $X_1$ and/or $X_2$ can be hydroxy radical. $R_1$ and $R_2$ are the same or different radicals selected from the group comprising divalent alkyl radicals of the general Formula $-CH_2)_m$ wherein m is 2 to 10, divalent aryl radicals of the formula

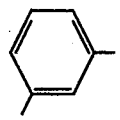

or of the formula

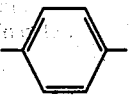

or such radicals containing substituents such as methyl or halogen preferably chlorine or bromine.

In the compounds of the general Formula II, $R_3$ is a radical selected from the group comprising divalent radicals of the general Formula $-CH_2)_m$, wherein m is 1 to 2, divalent aryl radicals of the formula

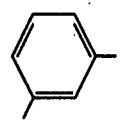

or of the formula

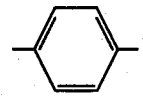

or such radicals containing substituents such as methyl or halogen preferably chlorine or bromine, A and $X_1$ and $X_2$ are radicals selected from the groups defined Formula I above.

It was discovered that the novel compounds of the general Formula I are prepared in good yields by reacting N-halopolyamides preferably N-chloropolyamides or N-bromopolyamides of the general Formula III

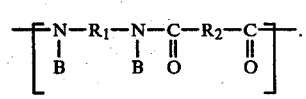     III wherein B is halogen or preferably in part hydrogen and in part halogen preferably chlorine or bromine, and $R_1$ and $R_2$ are radicals selected from the group of radicals defined in Formula I, above with compounds of the Formula IV

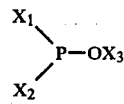     IV wherein $X_1$ and $X_2$ are radicals selected from the group of radicals defined in Formula I excepting hydroxy radicals and $X_3$ is alkyl having preferably from 1 to 4 carbon atoms or such an alkyl radical containing halogen.

It was also discovered that the compounds of the general Formula II can be prepared by reacting the compounds of the general Formula IV with N-halopolyamides of the general Formula V

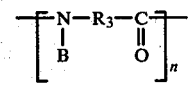     V wherein B is halogen or preferably in part hydrogen and in part halogen preferably chlorine or bromine and $R_3$ is a radical selected from the group of radicals defined in Formula II.

The general reaction which occurs when B is halogen, preferably chlorine or bromine, is the following:

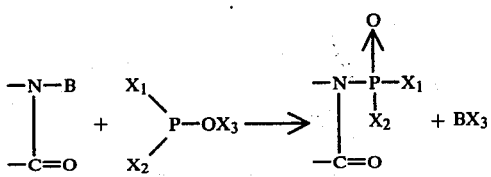

The reaction is carried out by contacting the reagents neat or in a reaction medium consisting of a solvent or solvent mixtures and by maintaining the temperature of the reaction mixture from $-10°$ to $90°$ C. until the reaction is completed. Solvents which may be employed are carbon tetrachloride, tetrachloroethane, chloroform, N,N-dimethylacetamide, N-methylpyrrolidone hexamethylphosphoramide or such solvents containing salts such as lithium chloride. The choice of the solvent or solvent mixtures will be governed by such factors as swelling ability of the solvent for the polymer reactant, solubility of the reactants, economy of the particular application, facilitation of the reaction and its control, ease of the recovery of the product as well as many other considerations. In all instances however the solvents used should be substantially non-reactive with the reactants, the reaction intermediates and the products under the prevalent reaction conditions.

The novel compounds of Formula I and of Formula II wherein $X_1$ and/or $X_2$ are hydroxy radicals are produced by heating the compounds of Formula I or of Formula II wherein $X_1$ or $X_2$ are alkoxy, cycloalkoxy arylalkoxy or aryloxy radicals in a reaction medium containing water or in such a medium made acidic with an acid such as hydrochloric acid, formic acid and the like.

The compounds of Formula I and of Formula II are useful because in comparison to the present polyamides they show increased thermal stability and fire resistance. They also manifest better processability, particularly the N-(substituted phosphinyl)polyamides, and higher water absorption and permeability therefore increased comfort for textile materials. The compounds wherein $X_1$ and/or $X_2$ are hydroxy radicals find application as ion exchangers or as metal complexing agents.

EXAMPLE 1

N-(Substituted phosphinyl) Nylon-66 and Nylon 6

This example demonstrates the application of the method of the invention in cases where the reactants are trialkyl phosphites and N-chloropolyamides produced by the N-chlorination of polyamides with t-butyl hypochlorite.

The N-chlorination of Nylon-66 or Nylon-6 is carried out by stirring a suspension of polymer powder in a solution of t-butyl hypochlorite in 1, 1, 2, 2-tetrachloroethane. The concentration of the chlorinating solutions, the mol ratios and the reaction temperatures are shown in Table I. As N-chlorination is progressing the polymer swells and at high degrees of N-chlorination a solution is obtained. The reaction mixture is added into an excess of ether, whereupon the product precipitated. Subsequently it is filtered, washed and dried under high vacuum. The yields obtained are better than 90%. The percentages of N-chlorination is determined by iodometric titration and are shown in Table I. The $\overline{M}_v$ of the products are determined after dechlorination.

TABLE I

| | N—Chlorination of powdered Nylon-66 and Nylon-6 with t-BuOCl in 1,1,2,2-tetrachloroethane. | | | |
|---|---|---|---|---|
| Polyamide | t-BuOCl solution molarity | t-BuOCl NHCO mol mol | Reaction time min. | N—Cl mol % |
| Nylon-66[a] | 0.52 | 2.2 | 180[b] | 96.4 |
| Nylon-66[a] | 1.09 | 2.2 | 30[c] | 29.3[d] |
| Nylon-66[a] | 1.09 | 2.2 | 5[c] | 16.7[e] |
| Nylon-6[f] | 0.52 | 1.1 | 3600[b] | 63.8 |
| Nylon-6[f] | 1.38 | 1.1 | 30[b] | 47.2[g] |

[a]$\overline{M}_v$ 17500.
[b]Reaction temperature, 15° C.
[c]Reaction temperature, 12° C.
[d]$\overline{M}_v$ 10600.
[e]$\overline{M}_v$ 14500.
[f]$\overline{M}_v$ 25400.
[g]$\overline{M}_v$ 23200.

Suspensions or solutions of N-chloropolyamides in chloroform are treated with a slight excess of trialkyl phosphites shown in Table II at room temperature for 30 min under an inert atmosphere. The reactions are fast and exothermic. The N-phosphinyl polyamides precipitate as the reaction progresses. After the end of the reaction ether is added into the reaction mixture in order to complete the precipitation. The products are filtered, washed and dried under high vacuum at 60° C. for 20 hrs. They are analyzed photometrically for phosphorus after digestion of the samples in sulfuric acid. No unreacted N-Cl was detected iodometrically. The LOI (Limiting Oxygen Index) of the products is determined by the method ASTM D 2863-70. The tensile strengths of some of the products were measured. The results are shown in Table II.

TABLE II

| | Reactions of N—chloro Nylon-66 and Nylon-6 with $(XO)_3P$ in chloroform. | | | |
|---|---|---|---|---|
| Polyamide | N—Cl mol % | X | P weight % | LOI |
| Nylon-66[a] | 16.7[b] | $CH_3$ | 0.7[c] | 27.5 |
| Nylon-66[a] | 29.3[d] | $CH_3$ | 1.5 | 27.5 |
| Nylon-66[a] | 96.4 | $CH_3$ | 6.2 | 32.0 |
| Nylon-66[a] | 18.5 | $CH_3CH_2$ | 0.7[e] | 27.5 |
| Nylon-66[a] | 35.3 | $CH_3CH_2$ | 1.3[f] | 28.5 |
| Nylon-66[a] | 29.3 | $ClCH_2CH_2$ | 2.1 | 29.5 |
| Nylon-66[a] | 29.3 | $CH_3CHBrCH_2$ | 2.7 | 32.5 |
| Nylon-6[g] | 47.2[h] | $CH_3$ | 2.5 | 26.5 |
| Nylon-6 | 63.8 | $CH_3$ | 3.9 | 26.5 |
| Nylon-6 | 47.2[e] | $ClCH_2CH_2$ | 2.4 | 27.5 |
| Nylon-6 | 61.1 | $ClCH_2CH_2$ | 3.5 | 30.0 |

[a]$\overline{M}_v$ 17500; T.S., 207 Kg/cm$^2$; LOI, 20.5.
[b]$\overline{M}_v$ 14500.
[c][η], 0.72 dl/g in m-cresol at 25° C.; T.S., 165 Kg/cm$^2$.
[d]$\overline{M}_v$ 10600.
[e]T.S., 174 Kg/cm$^2$.
[f]T.S., 155 Kg/cm$^2$.
[g]$\overline{M}_v$ 25400; LOI, 21.
[h]$\overline{M}_v$ 23200.

EXAMPLE 2

N-(dimethoxyphosphinyl) Nylon-66 and
N-(dimethoxyphosphinyl) Nylon-6

This example demonstrates the application of the method of the invention without the use of a solvent and with reactants trimethylphosphite and N-chloro Nylon-6 and N-chloro Nylon-66 produced by the treatment of the corresponding polyamides with aqueous KOCl solution.

The N-chlorination of Nylon-66 and Nylon-6 is carried out by stirring a suspension of polymer powder of particle diameter smaller than 250 microns at 0° C. in an aqueous KOCl solution from 20% aqueous potassium hydroxide solution and 100 mg of chlorine per ml, until a certain percentage of N-chlorination is obtained. The product is filtered, washed and dried under high vacuum for 20 hrs. It is analyzed by iodometric titration. The obtained N-chloropolyamides are treated at 90° C. with excess of trimethylphosphite for 7 hrs without solvent. The results are shown in Table III.

TABLE III

Preparation of N—chloro Nylon-66 and N—chloro Nylon-6 by treatment of Nylon-66 and Nylon-6 with aqueous KOCl solution and their reactions with $(CH_3O)_3P$ in the absence of solvent.

| Polyamide | N—Cl weight % | P weight % | LOI |
|---|---|---|---|
| Nylon-66[a] | 1.7[c] | 1.1[e] | 28.5 |
| Nylon-6 | 1.4 | 0.9[f] | 24.5 |
| Nylon-6[b] | 2.4[d] | 1.1[f] | 24.5 |

[a]$\overline{M}_v$ 13200.
[b]$\overline{M}_v$ 31000.
[c]$\overline{M}_v$ after dechlorination 6000.
[d]$\overline{M}_v$ after dechlorination 19300.
[e]Rxn time 7 hrs.
[f]Rxn time 30 min.

EXAMPLE 3

N-(dimethoxyphosphinyl)poly(m-phenylene isophthalamide)

Powdered poly(m-phenylene isophthalamide) of $\overline{M}_v$ 45000, tensile strength 332 Kg/cm$^2$ and LOI 39 is N-chlorinated with a 0.14 molar solution of t-butyl hypochlorite in methanol, containing 4% borax, at 5° C. for 5 min. No C-chlorination is observed. A suspension of the obtained powder of N-chlorinated poly(m-phenylene isophthalamide) in a solution containing 26 mmols of trimethyl phosphite per 100 ml of chloroform is maintained at 8° C. for 1 hr. The reaction mixture is decanted in excess pentane and the precipitate is filtered, washed and dried under high vacuum. It is analyzed for phosphorus and its LOI is determined.

The product contained 1.8% of phosphorus, its LOI is 75.0 and its tensile strength is 314 Kg/cm$^2$.

EXAMPLE 4

N-(di(2-chloroethoxy)phosphinyl)poly(m-phenylene isophthalamide)

The method of EXAMPLE 3 is applied to carry out the reaction of N-chloro poly(m-phenylene isophthalamide) with tri(2-chloroethyl) phosphite. The obtained N-(di(2-chloroethoxy)phosphinyl)poly(m-phenylene isophthalamide) product contains 2.6% of phosphorus and its LOI is 78.0.

EXAMPLE 5

N-(di(2-bromopropyl)phosphinyl)poly(m-phenylene isophthalamide)

The method of EXAMPLE 3 is applied to carry out the reaction of N-chloro poly(m-phenylene isophthalamide) with tri(2-bromopropyl) phosphite. The obtained product contains 1.5% of phosphorus and its LOI is found to be 75.

EXAMPLE 6

Treatment of Nylon fabric

Specimens of fabric with warp from Nylon-6 and weft from Nylon-66 weighing 0.9 g/100 cm$^2$ having an LOI of 19.8 are N-chlorinated to the extent of 30.6% after 23 hour treatment at 25° C. with a 1.4 molar solution of t-BuOCl in carbon tetrachloride. After washing with acetone, the specimens are treated at 25° C. with a solution containing 64 mmols of a trialkyl phosphite per 100 ml of chloroform, then washed and dried. The specimens which are treated with trimethyl phosphite for 28 hrs contain 0.7% P and have an LOI of 24.0. The specimens which are treated with tri(2-chloroethyl) phosphite contain 0.5% P and have an LOI of 27.5. No unreacted N-Cl is detected.

EXAMPLE 7

Treatment of Nomex fabric

Specimens of Nomex fabric are N-chlorinated by treatment at 5° C. for 2.5 hrs with an 0.8 molar solution of t-butyl hypochlorite in methanol containing 4% borax. After washing and drying, the specimens are treated at room temperature for 20 hrs with a solution containing 33 mmols of a trialkyl phosphite per 100 ml of chloroform. Then, they are washed and dried. No unreacted N-Cl is detected. The specimens which are treated with trimethyl phosphite are found to have 0.4% B and an LOI of 52.0. The specimens which are treated with tri(2-chloroethyl) phosphite are found to have 0.4% P and an LOI of 52.0, while the LOI of the untreated specimens is 30.5.

EXAMPLE 8

N-(substituted phosphinyl) Nylon-6I0

This example demonstrates the application of the method of the invention in cases wherein the reactants are N-chloro Nylon-6I0 having 54.9 mol% N-Cl produced by N-chlorination of Nylon 610 with t-BuOCl and the trivalent phosphorus reactant is trimethyl phosphite or tri(2-chloroethyl)phosphite or tri(2-bromopropyl)phosphite. The method of example I is applied. The obtained N-(dimethoxyphosphinyl) Nylon-6I0 has 2.7 weight% of phosphorus and an LOI of 24.0. The obtained N-(di(2-chloroethoxy)phosphinyl) Nylon-6I0 has 4.4 weight% of phosphorus and an LOI of 26.5. The obtained N-(di(2-brompropoxy)phosphinyl) Nylon-610 has 2.5 weight% of phosphorus and an LOI of 28.5. The LOI of unmodified Nylon-610 is 22.5.

EXAMPLE 9

N-(substituted phosphinyl)Nylon-II

This example demonstrates the application of the method of the invention in cases wherein the reactants are N-chloro Nylon-II and trimethylphosphite or tri(2-chloroethyl)phosphite or tri(2-bromopropyl)phosphite. The method of example I is applied. The obtained N-(dimethoxyphosphinyl)Nylon-II with 2.1 weight% of phosphorus has a LOI of 23.0. The obtained N-(di(2-chloroethoxy)phosphinyl)Nylon-II with 2.2 weight% of phosphorus has an LOI of 24.5. The obtained N-(di(2-bromopropoxy)phosphinyl)Nylon-II with 1.9 weight% of phosphorus has a LOI of 24.0. The LOI of unmodified Nylon-II is 23.0.

EXAMPLE 10

The compounds of general Formula I and of the general Formula II are useful as flame retardant additives for the preparation of fire resistant compositions of polymer blends or of composites. The purpose of this example is to demonstrate their effectiveness as flame retardant additives. Powder of N-(dimethoxyphosphinyl)Nylon-66 was mixed with powder of Nylon-66.

The Limiting Oxygen Indexes LOI of the specimens formed by hot pressing of the blend in a mold are determined by the method ASTM D 2863-70 and show that the blends have increased fire resistance in comparison to the neat Nylon-66. The LOI of Nylon-66 is 20.5. The LOI of a blend containing 0.4 weight% of phosphorus is 25. The LOI of a blend containing 1.4 weight% of phosphorus is 26 and the LOI of a blend containing 3.1 weight% of phosphorus is 28.5.

It should be understood that various changes may be made in the illustrative methods and compounds without departing from the scope of the present invention. It is intended therefore that the preceding description should be construed as illustrative only and not in a limiting sense.

I claim:

1. A solid N-(substituted phosphinyl) polyamide consisting essentially of the recurring structural unit represented by the formula:

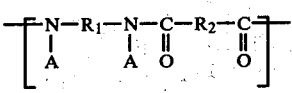

wherein A is from 0.9 to 0.4 mol hydrogen and from 0.1 to 0.6 mol substituted phosphinyl radical of the formula

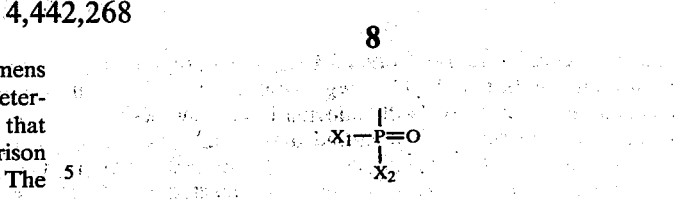

wherein $X_1$ and $X_2$ are the same or different radicals selected from the group consisting of dimethylamino, diethylamino, aziridinyl, hydroxy, substituted and unsubstituted radicals selected from the group consisting of alkyl and alkoxy having 1 to 4 carbon atoms, cyclohexyloxy, phenoxy, benzyloxy and phenyl, the substituents being selected from the group consisting of from 1 to 4 chlorine and bromine atoms; $R_1$ and $R_2$ being the same or different radicals selected from the group consisting of alkylene radicals of the formula $-(CH_2)_m-$, wherein m is from 2 to 10 unsubstituted and substituted m-arylene and p-arylene, wherein the substituent is selected from the group consisting of 1 to 2 chlorine and bromine atoms.

2. The polyamide of claim 1, wherein $R_1$ is $-(CH_2)-_6$ and $R_2$ is $-(CH_2)-_4$.

3. The polyamide of claim 1, wherein $R_1$ is $-(CH_2)-_6$ and $R_2$ is $-(CH_2)-_8$.

4. The polyamide of claim 1, wherein $R_1$ and $R_2$ are 1,3-phenylene.

5. The polyamide of claim 1, wherein $R_1$ and $R_2$ are 1,4-phenylene.

* * * * *